Figure 1A:
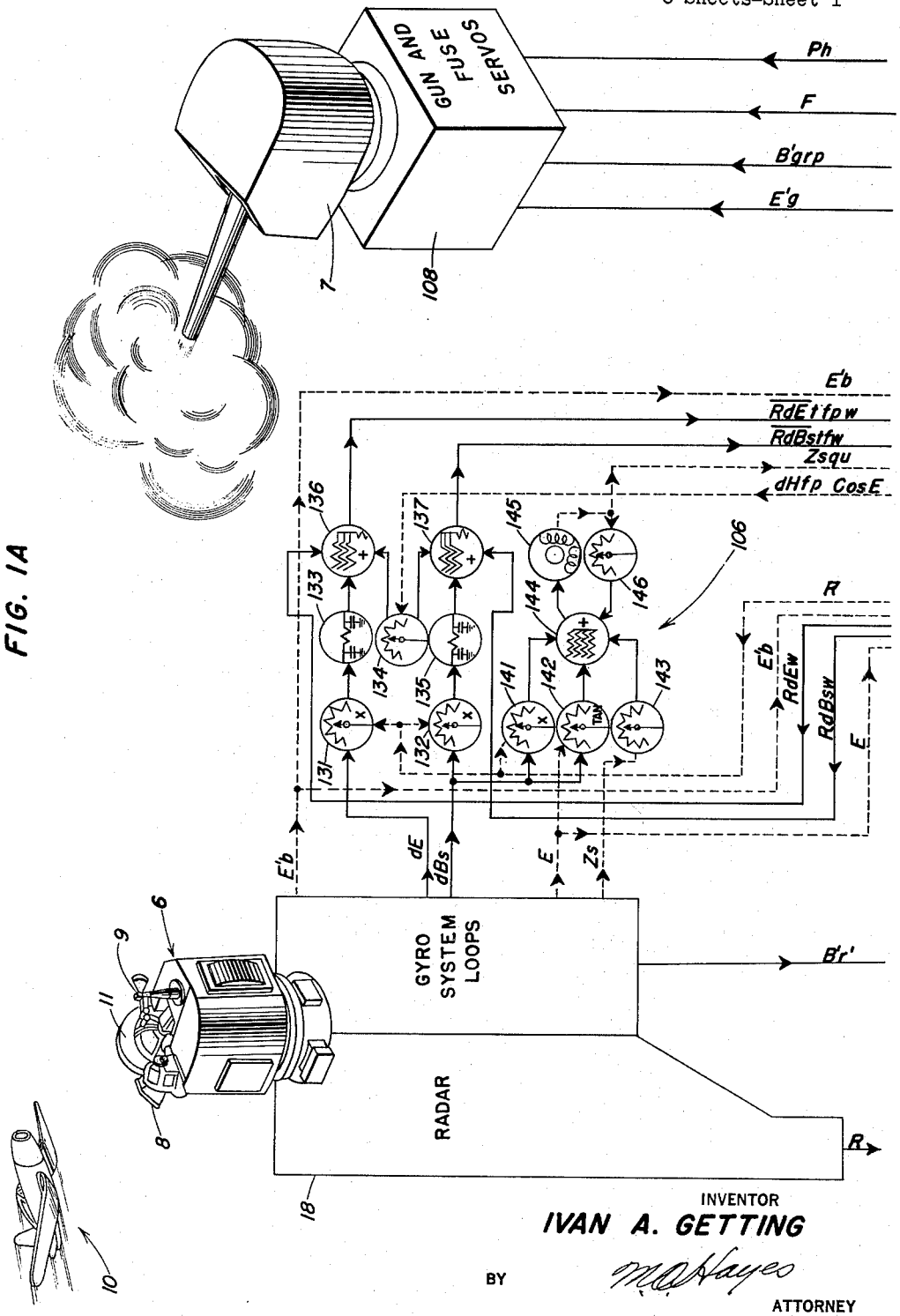

Aug. 11, 1964     I. A. GETTING     3,144,644
GUN FIRE CONTROL METHOD AND SYSTEM
Filed Nov. 23, 1948     6 Sheets-Sheet 1

INVENTOR
IVAN A. GETTING
BY *M. A. Hayes*
ATTORNEY

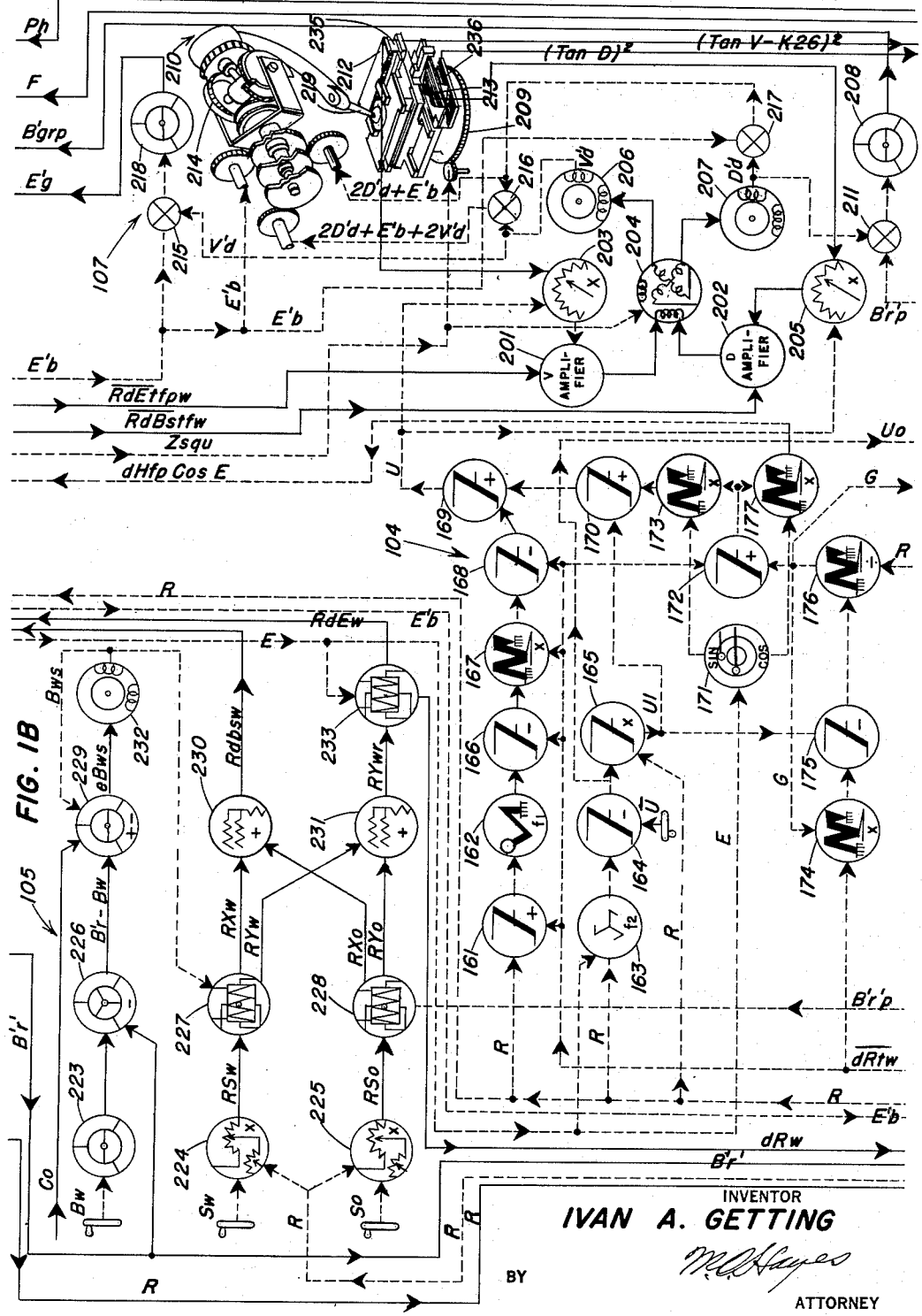

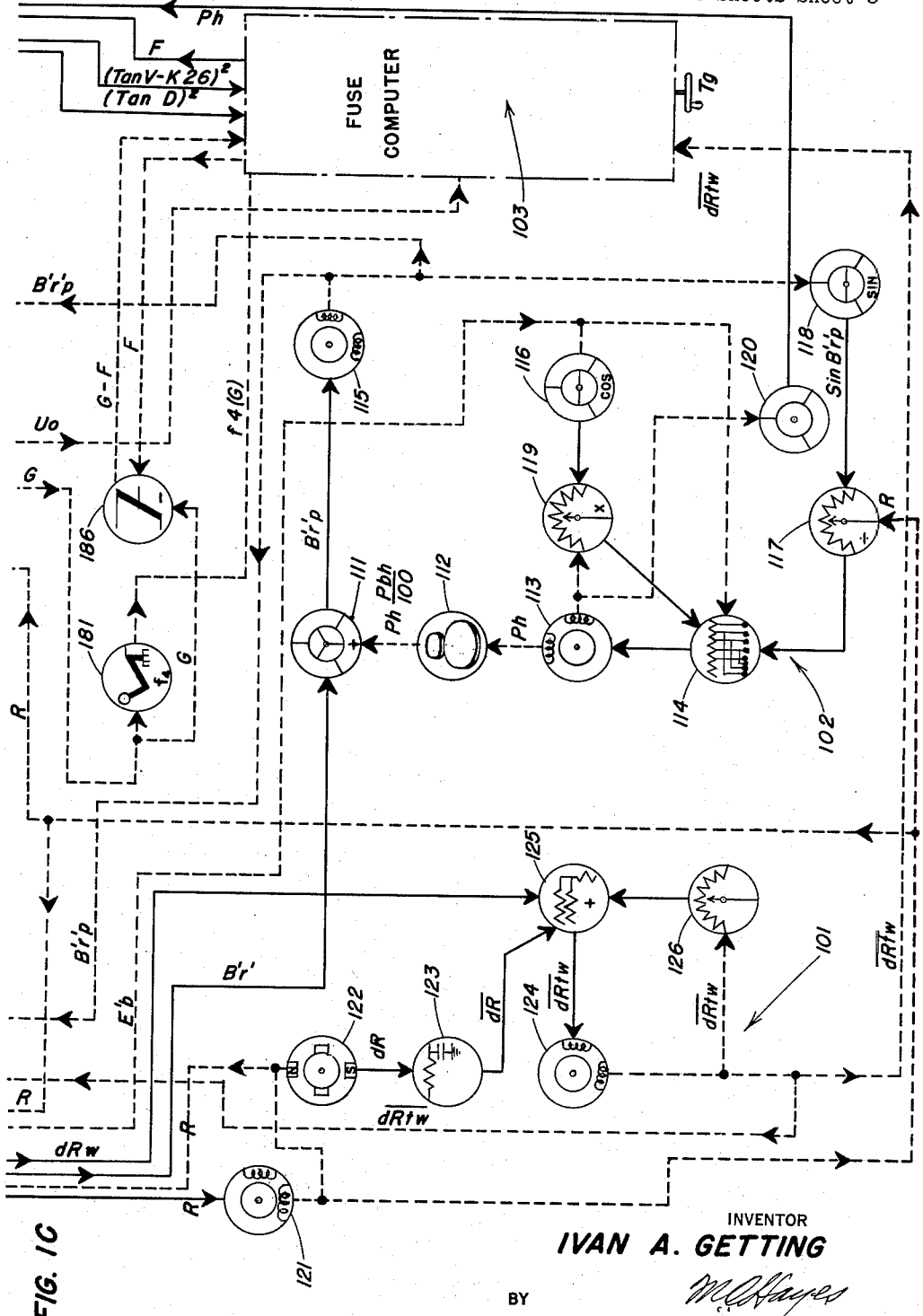

Aug. 11, 1964     I. A. GETTING     3,144,644
GUN FIRE CONTROL METHOD AND SYSTEM
Filed Nov. 23, 1948     6 Sheets-Sheet 4

INVENTOR
*IVAN A. GETTING*
BY M. A. Hayes
ATTORNEY

Aug. 11, 1964     I. A. GETTING     3,144,644

GUN FIRE CONTROL METHOD AND SYSTEM

Filed Nov. 23, 1948     6 Sheets-Sheet 5

FIG. 3B

FIG. 3A

OP — PRESENT RANGE (R)
dE — INSTANTANEOUS ANGULAR ELEVATION RATE
dBs — INSTANTANEOUS ANGULAR TRAVERSE RATE
dR = INSTANTANEOUS RANGE RATE

RATES OF TARGET MOTION

B'r — DIRECTOR TRAIN
E'b — DIRECTOR ELEVATION
OP = PRESENT RANGE (R)

FIRE CONTROL PROBLEM COORDINATES

INVENTOR
IVAN A. GETTING

BY

ATTORNEY

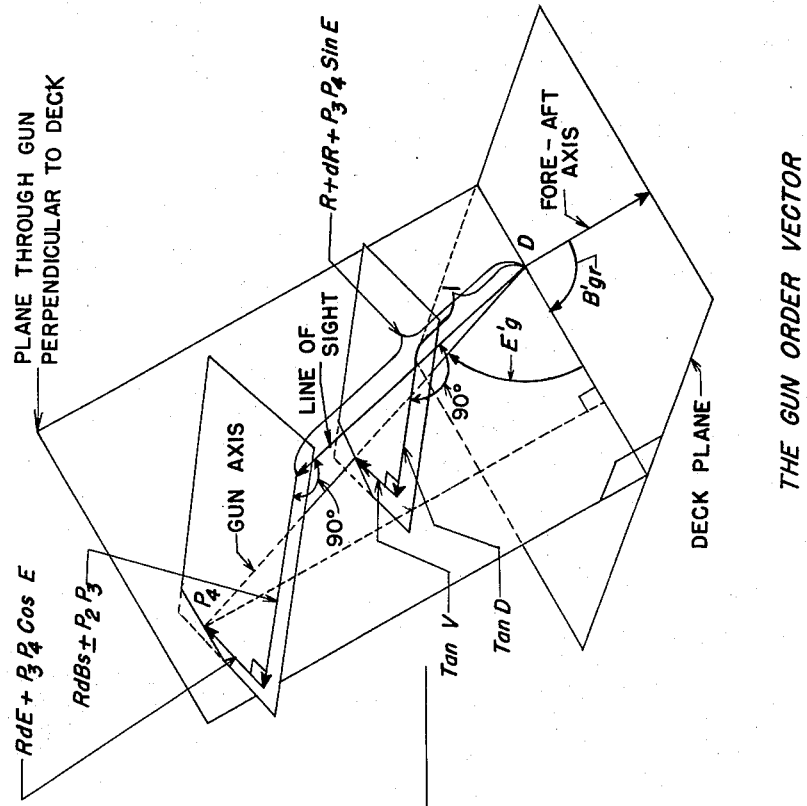
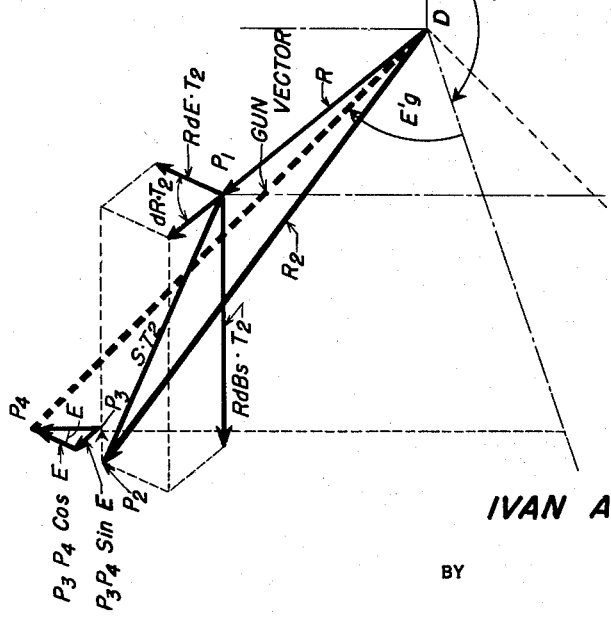

3,144,644
GUN FIRE CONTROL METHOD AND SYSTEM
Ivan A. Getting, Belmont, Mass., assignor, by mesne assignments, to the United States of America as represented by the Secretary of the Navy
Filed Nov. 23, 1948, Ser. No. 61,558
19 Claims. (Cl. 343—7)

This invention relates to a gun fire control method and system suitable for use aboard a vessel, and more particularly to a method and apparatus employing radar for obtaining information regarding the present position of a target and the rate and direction of movement thereof and utilizing this information to control the fire of a gun in relation to the target.

According to the preferred embodiment of apparatus suitable for practicing the invention, a gun director having two gyroscopes is employed. One of these gyroscopes, to be called herein the line-of-sight gyroscope, is utilized to give stabilization along the line of sight and to reproduce angular rates around two mutually perpendicular axes, both perpendicular to the line of sight. Tracking is performed by precessing this gyroscope externally, the director being required by servo follow-up to keep itself substantially in alignment with the line-of-sight gyroscope. The second gyroscope is called herein the vertical gyroscope and is utilized to provide voltages which are measurements of true elevation and cross traverse. The cross traverse voltage is used to prevent rotation about the line of sight resulting from the motion of the vessel from affecting the line-of-sight gyroscope.

Apparatus for utilizing the information supplied by the director and gyroscopes for computing gun and fuze orders includes range and range rate networks; elevation, traverse, and cross traverse networks; a wind resolution network; a train parallax corrector; a ballistics computer; a gun order converter; and, a fuze computation circuit.

Prior art devices are characterized by one or more of several disadvantages; in some of these, accurate stabilization is required not only for present position computation, but also for measurement of rates. In other prior art systems, no provision is made to compensate for rotation around the line of sight; in still other systems, no physical present line of sight is available, so that the addition of radar adds complexity to the apparatus employing a displaced line of sight.

The method and apparatus of the subject invention overcomes these disadvantages, as will be more clearly apparent from the detailed description of the invention which follows and in which the following nomenclature is employed:

$B'gr$—gun train. The angle between the fore and aft axis of own ship and the plane through the gun perpendicular to the deck, measured in the deck plane clockwise from the bow.

$B'grp$—gun train order corrected for horizontal parallax of the director to the reference point of the ship.

$B'r$—director train in slant plane parallel to deck.

$B'r'$—director train. The angle between the fore and aft axis of own ship and the plane through the line of sight perpendicular to the deck, measured in the deck plane clockwise from the bow.

$B'r'p$—director train corrected for horizontal parallax to the reference point of the ship.

$Bw$—true direction of true wind. The angle between north and the direction from which the true wind is blowing, measured in a horizontal plane clockwise from north.

$Bws$—wind angle. The angle between a vertical plane containing the line of sight and the direction from which the true wind is blowing, measured in a horizontal plane clockwise from the direction from which the wind is blowing.

$c$—before a quantity indicates a generated voltage corresponding to that quantity and used for nulling purposes or for obtaining an error signal.

$Co$—own ship course. The angle between the north and south vertical plane and the vertical plane through the fore and aft axis of own ship measured in a horizontal plane clockwise from the bow.

$D$—traverse deflection. The angle between the line of sight and the plane through the gun perpendicular to the traverse plane, measured in the traverse plane clockwise from the line of sight.

$dBs$—angular traverse rate. The time rate of change of true target bearing measured in the traverse plane.

$D's$—deflection in the slant plane.

$D'd$—deck deflection. Gun train order minus director train.

$dE$—angular elevation rate. The time rate of change of target elevation.

$dHfp$—gravity drop rate corrected for vertical parallax. $dHfp = k24 \cdot k25G + k4\overline{dR}tw$.

$dR$—range rate. The time rate of change of range. (Further distinguished by the subscript "$t$" as $dRt$ when used in combination with range rate correction terms.)

$\overline{dR}tw$—computational range rate. Range rate for the computation of average shell velocity: the sum of the smoothed range rate due to relative motion of the target $\overline{dR}$ and a corrective term, $dRw$, applied to range rate to compensate for the effect on shell velocity due to the component of relative wind which lies along the line of sight.

$dRw$—range rate correction due to line of sight wind. A correction term applied to range rate to compensate for the effect on shell velocity due to the component of relative wind which lies along the line of sight.

$e$—before a quantity denotes the instantaneous error in the quantity.

$E$—target elevation. The elevation above the horizontal plane of the line of sight, measured in the vertical plane through the line of sight.

$E'b$—director elevation. The elevation of the director line of sight above the deck, measured in a plane perpendicular to the deck, through the line of sight.

$E'g$—gun elevation order—the elevation of the gun above the deck measured in a plane through the gun perpendicular to the deck.

$F$—fuze setting. Fuze setting in seconds.

$G$—computational time of flight. Time of flight to a hypothetical target which is following a radial path with a velocity equal to the range rate of the real target.

$Ph$—horizontal parallax. The angular correction to be applied to gun train order for a gun which is 100 yards fore of the reference point.

$R$—range. The distance in yards from the director to the target (measured along the line of sight).

$R2$—future range. The range at which the target will be when the projectile now being fired bursts.

$RdBs$—linear traverse rate. The component of the linear cross rate lying in the traverse plane. (Further distinguished by the subscript "$t$" as $RdBst$ when used in combination with linear traverse rate correction terms.)

$RdBsf$—linear traverse rate correction due to drift. A correction term applied to linear traverse rate to compensate for the effect of drift of the projectile.

$\overline{RdB}stfw$—computational linear traverse rate. Linear traverse rate for the computation of lead angle: the sum of the smoothed linear traverse rate due to relative motion of the target $\overline{RdB}s$, a corrective term to compensate for the effect of drift $RdBsf$, and a corrective term to compensate for the effect of cross wind, $RdBsw$.

R$d$B$sw$—linear traverse rate correction due to cross wind. A correction term applied to linear traverse rate to compensate for the effect on shell velocity due to the cross wind.

R$d$E—linear elevation rate. The component of the linear cross rate lying in a vertical plane through the line of sight. (Further distinguished by the subscript "$t$" as R$d$E$t$ when used in combination with linear elevation rate correction terms.)

R$d$E$fp$—linear elevation rate correction due to gravity drop rate and vertical parallax. A correction term applied to linear elevation rate to compensate for the effect of gravity drop rate and vertical parallax. R$d$E$fp$=$d$H$fp$ cos $E$.

$\overline{RdE}tfpw$—computational linear elevation rate. Linear elevation rate for the computation of lead angle: the sum of the smoothed linear elevation rate due to relative motion of the target $\overline{RdBs}$, a corrective term to compensate for the effect of gravity drop and vertical parallax, and a corrective term to compensate for the effect of relative wind perpendicular to the line of sight in a vertical plane. $\overline{RdE}tfpw=\overline{RdE}+RdEw+RdEfp$.

R$d$E$w$—linear elevation rate correction due to elevation wind. A correction term applied to linear elevation rate to compensate for the effect on shell velocity due to the component of relative wind perpendicular to the line of sight in a vertical plane.

S$o$—own ship speed. The speed of own ship relative to the earth.

S$w$—true wind speed. The horizontal velocity of true wind with respect to the earth.

T2—time of flight to future position of target.

T$g$—dead time. The time in seconds between cutting a fuze and firing the projectile.

T$q$—smoothing time. The time by which linear traverse rate and linear elevation rate may be considered to be late due to smoothing.

$\overline{U}$—measured average shell velocity. The average shell velocity over the range interval 1,000 to 3,000 yards with zero gun elevation and no wind.

U—average shell velocity for lead angle computation.

U$o$—a shell velocity employed in fuze computation.

U$t$—U prediction. The increment of U which must be included to take account of target motion during time of flight.

U1—average shell velocity to present position of the target.

U2—average shell velocity. The quotient of range to future position divided by time of flight.

U3. $$U3=\frac{R}{T2}+dR+dHfp\sin E$$

V—vertical deflection angle. The angle between the line of sight and the plane through the gun perpendicular to the vertical plane through the line of sight measured in the vertical plane through the line of sight, positive when the gun is above the line of sight.

V′$d$—elevation difference. Gun elevation order minus director elevation.

X$o$—horizontal cross component of own ship velocity. The horizontal component of own ship velocity perpendicular to the vertical plane through the line of sight, positive when from right to left looking along the line of sight.

X$w$—cross wind due to true wind. The component of true wind perpendicular to the vertical plane through the line of sight. (Positive when cross wind is from left to right.)

X$wr$—relative cross wind. The component of relative wind perpendicular to the vertical plane through the line of sight. (Positive when cross wind is from left to right.)

Y$o$—horizontal range component of own ship velocity. The horizontal component of own ship velocity in the vertical plane through the line of sight, negative when along the line of sight.

Y$w$—range wind due to true wind. The horizontal component of true wind in the vertical plane through the line of sight. (Positive when along the line of sight.)

Y$wr$—relative range wind—the horizontal component or relative wind in the vertical plane through the line of sight. (Positive when along the line of sight.)

Z$q$—smoothing rotation about the line of sight. A rotation increment of the grid of the gun order converter about the line of sight necessary to correct for the smoothing of the linear traverse and elevation rates. It is equal to $Tq.dBs.\tan E$, and is measured clockwise about the line of sight.

Z$s$—cross traverse. The angle, measured in a plane perpendicular to the line of sight, between a vertical plane through the line of sight and a plane perpendicular to the deck through the line of sight. That is, Z$s$ is the angle of rotation of the director about the line-of-sight. (Positive for the purposes of computation if, when you face the target, the right hand side of the ship is up.)

Z$squ$—computational rotation about the line of sight. The sum of cross traverse, smoothing rotation about the line of sight, and a corrective term.

Z$u$—a correction to cross traverse.

One of the objects of the instant invention is to provide new and improved gun fire control apparatus employing radar for obtaining information concerning the position of the target in motion and utilizing this information to control the firing of a gun.

Another object is to provide gun fire control apparatus having a director which includes means for stabilizing the line of sight of the director against the roll and pitch of the vessel.

A further object is to provide a new and improved method of gun fire control.

A further object is to provide new and improved gun fire control apparatus characterized by accuracy of information and simplicity of computation of gun orders.

Still another object is to provide gun fire control apparatus in which a director provides information as to variations in the elevation of the target in deck coordinates and provides information as to the range of the target and directions of movements thereof in true coordinates and combines this information to obtain gun orders in deck coordinates.

Still another object is to provide gun fire control apparatus in which the movement of the vessel as it rolls and pitches is measured and utilized to provide corrections to the gun orders to compensate for said movements.

Figure 2:
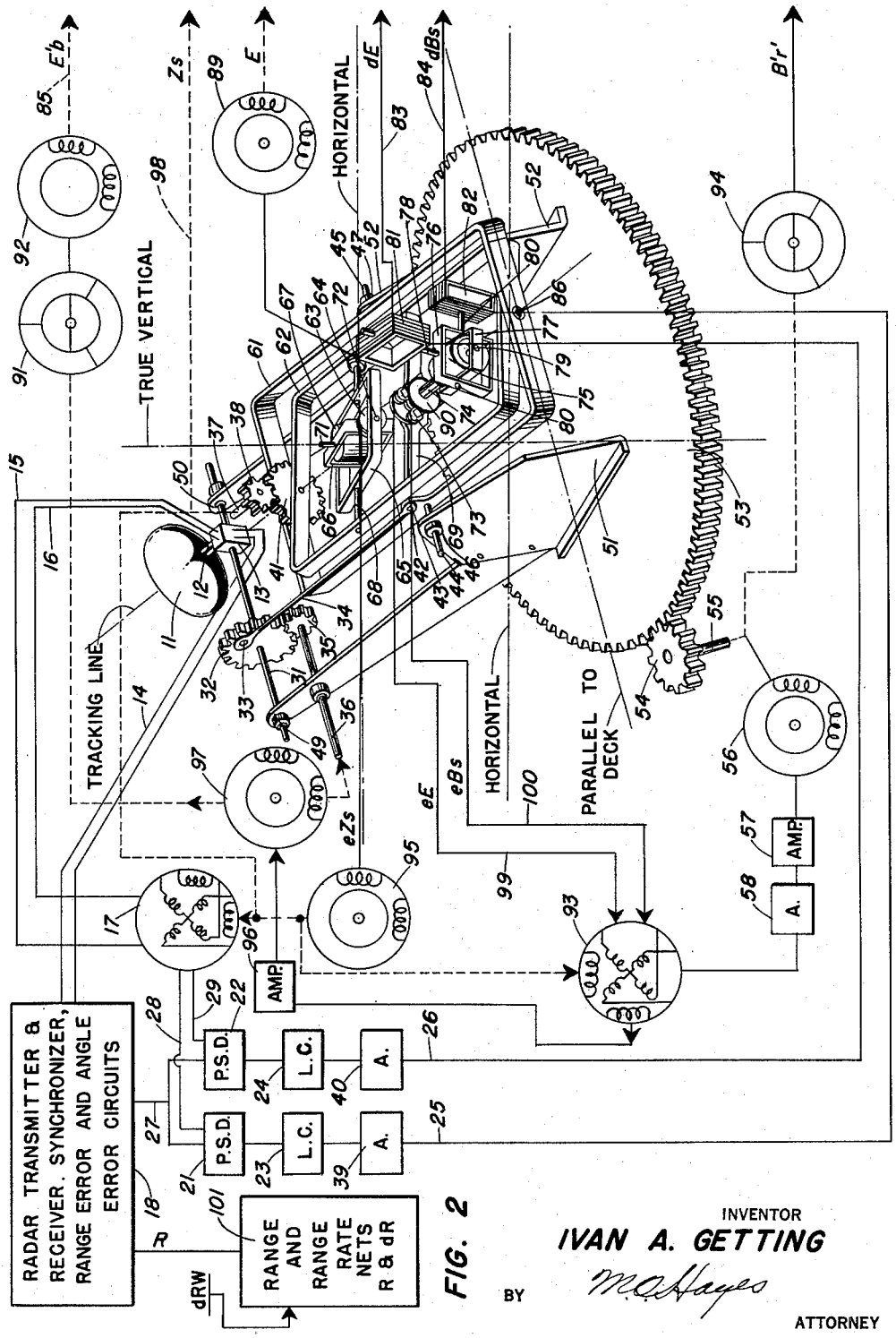

Other objects and many of the attendant advantages of this invention will be readily appreciated as the same becomes better understood by reference to the following detailed description when considered in connection with the accompanying drawings wherein:

FIGS. 1A, 1B and 1C taken together comprise a schematic circuit diagram in block form of the complete system of apparatus suitable for practicing the method of the invention;

FIG. 2 is a schematic diagram of the director, drive circuits, and circuits for obtaining target information; and FIGS. 3A, 3B, 3C and 3D are geometric diagrams illustrating the operation of the system of FIGS. 1A, 1B and 1C.

Reference is made now to the drawings, and in particular to FIGS. 3A, B, C, and D thereof, in which are shown geometrical figures illustrating the fire control problem which the method and apparatus of the subject invention is designed to solve. The figures are simplified in that the deck of the ship is assumed to be horizontal, and no roll is taking place.

Present range R is measured along the line of sight by the radar equipment of the fire control system. Since the director of the subject invention, as will be subsequently explained more fully, is a two-axis director and trains in the deck plane, present target bearing in terms of director train B′$r$′ is measured in the deck plane between the fore and aft axis of own ship and a plane containing the line of sight perpendicular to the deck plane. Since, as a result of gyroscopic action in holding on the line of sight, in a manner to be subsequently explained, only the antenna elevates, present target elevation in terms of director elevation E′b is measured in the aforesaid plane containing the line of sight perpendicular to the deck, between the deck plane and the line of sight. By means of the vertical gyroscope, true elevation of the target E as the elevation of the line of sight above the horizontal plane, measured in the vertical plane through the tracking line, can also be ascertained, in a manner to be subsequently explained in detail.

Rates of target motion are measured in the vertical plane containing the line of sight and in traverse planes respectively passing through, and perpendicular to, the line of sight. This stabilized reference system is pictured, FIG. 3B, as a set of mutually perpendicular coordinates at the present position of the target designated P; the range rate vector $dR$ lies along the line of sight while the elevation rate vector $dE$ lies perpendicular to the line of sight in the vertical plane and the horizontal rate vector $dBs$ lies horizontally perpendicular to the line of sight and along the intersection of the traverse planes. When the rate vectors are rotated about the line of sight, they move in the cross traverse plane which is perpendicular to the line of sight.

The angular target rates are measured in this coordinate system by the precession of the line of sight gyroscope, in a manner to be subsequently described in detail. When fastened on a target, the line of sight gyroscope maintains its position independently of the roll, pitch, or yaw of the ship.

If, however, the target moves from its present position, a radar error signal is generated which, after comparison with reference voltages, is used to provide signals which are proportional to the displacement of the target from the antenna axis in elevation and true traverse directions. Two direct currents proportional to the radar error signals are generated and passed through elevation and traverse torque motors, hereafter to be described, operatively associated with the line-of-sight gyroscope in the director. The precession rates induced by these currents are proportional to the currents. Since the director antenna must follow the line-of-sight gyroscope, the antenna is made to move with angular rates proportional to the displacement between the line of sight and the gyroscope. If the error in the position of the line of sight is just sufficient to develop angular rates of the director equal to those of the target as viewed from the director, the director will smoothly follow the target. If the error between the line of sight and the target happens to be large for the given target rate the director system will move more rapidly, in a manner to be presently described, until the errors, and thus the currents passing through the gyroscope torque motors, are appropriate to the true target rates. Thus the currents through the torque motors are proportional to the two components of the angular velocity of the target.

The radar error signal for a fixed error is far from constant. Fading, change of target aspect, and many other conditions cause the error signals to fluctuate rather widely. Accordingly, a smoothing or averaging process is necessary. In the instant system, for purposes of smoothing, the angular rates are preferably averaged over a period of two seconds.

The vertical gyroscope measures the true elevation angle of the line of sight. It also measures the cross traverse angle Zs, elsewhere defined.

Present target position information is accordingly obtained in a combination of deck and stabilized coordinates and target rate information in stabilized coordinates. Since gun orders must be computed in terms of deck coordinates, the computing system hereinafter to be described is designed to compensate for the different sets of coordinates in the process of solving for gun and fuze orders.

The inputs to the computing system and their source in the director are shown schematically in FIG. 2.

Through the use of measurements made available by the director and other sources, the computing section of the fire control system must determine gun train, gun elevation, and fuze setting orders so that the shell will explode on reaching the future position of the target. In order to do this, it is necessary to predict where the target will be after the elapse of the time it takes the shell to reach it. Since it is impossible to predict accurately the target's future motion, the assumption is made that the target will maintain its course in a straight line at a constant speed.

FIG. 3C, to which particular reference is now made, represents the fire control problem, somewhat simplified. P1 is the target's present position as defined by director D in terms of B′r′, E′b, and R. Vector S before multiplication by T2 may represent the observed target velocity relative to the director measured in terms of R, $dR$, $dBs$ and $dE$. At the end of time of flight of the projectile, T2, the target and shell are assumed to collide at P2, the theoretical future position of the target.

In terms of the coordinate system chosen, it is necessary to determine the components of the vector along which the gun must be aimed. The vector $DP2$=vector $R2$, where vector $R2$ is the range to future position $P2$ and may be decomposed into the sum of vectors R and ST2, and therefore has the components $$R2 = (R+dR.T2,\ RdBs.T2,\ RdE.T2)$$

The gun must be fired at a point above P2 to allow for the curved trajectory of the shell. To obtain the gun elevation, the sight angle appropriate to future range and elevation (R2 and E2) must be added to E. In the computing system employed in the instant invention, instead of computing E2, the superelevation effect is introduced through the addition of a vertical vector at P2; to overcome gravity effects on the shell, the gun must be aimed at P4, where P4 is obtained by adding the vertical vector P3P4, the gravity drop, to vector R2.

The drift effect is also introduced by a vector displacement P2P3 from P2. The drift displaces the shell in a horizontal plane to the right, perpendicular to the plane of fire. It has been found by empirical observation that the drift of a Navy standard 5″/38 projectile is approximately 1/20 of the gravity drop; accordingly, in a manner to be subsequently explained, the drift correction in the instant system is added to the $RdBs$ current after smoothing.

In the instant system, the gun is supplied orders which causes it to take up a position substantially along the direction DP4, the deck coordinates being called B′gr and E′g, both previously defined. For a gun not positioned at the director, a horizontal parallax correction is made, and the gun positioned in train by the quantity B′grp.

The computing apparatus of the instant invention, as elsewhere explained, does not use the vector DP4, but makes use of another vector of different magnitude but with the same direction in space.

Particular reference is made now to FIG. 1A, in which is shown a director generally designated by the reference numeral 6 for obtaining information about a target such as the aircraft 10, the director being adapted to be mounted upon the deck of a vessel and rotated in train by the quantity B′r′ by means hereinafter to be described. The director has a radar antenna reflector 11 which is adapted to be positioned in elevation by the quantity E′b, by means hereinafter to be described.

Mounted upon the director are an optical sight, generally designated by the reference numeral 8, and a slew sight, generally designated by the reference numeral 9, the slew and optical sights being provided for positioning the director to acquire a target which is visible to a fire control officer or other person located in the director. The slew and optical sights may be operatively connected by relays or other means to the remainder of the system, in any convenient manner well known to those skilled in the art.

Reference is made now to FIG. 2, in which the arrangement of the more important elements of the director are shown. The rotatable base of the director, indicated by the reference numeral 53, is adapted to rotate or pivot through an angle of 360° around an axis vertical to the deck of the vessel and has gear teeth meshing with the teeth of a driving gear 54, which is driven by shaft 55 by means hereinafter to be more fully described, to position the gear or base 53 in train. Fixedly mounted upon member 53 are a pair of spaced upright supports 51 and 52 which have bearing journals 46 and 47 respectively mounted therein for receiving bearing shafts 44 and 45.

Fixed to shafts 44 and 45, to rotate therewith, is a rectangular frame member 61, which is pivotally mounted to permit rotation about the axis of shafts 44 and 45. Mounted within member 61 is a second somewhat smaller rectangular frame member 62 adapted to rotate about an axis perpendicular to the axis of shafts 44 and 45, the bearing pin 86 being provided for this purpose and gear 41 being fixed to rotate with frame member 62 and adapted to freely rotate about a suitable pin or other mounting member (not shown) mounted in frame member 61. Gear 38, driven from shaft 37, meshes with gear 41 and positions the frame member 62 by the quantity $Zs$, in a manner to be subsequently more fully described.

Mounted within the frame member 62 are: the aforementioned vertical and line-of-sight gyroscopes, the vertical gyroscope comprising rotor 67 which may rotate upon shaft 71; inner gimbal ring 66 which may rotate with shaft 72 and having a pick-off transformer generally designated by the reference numeral 63 for obtaining a voltage proportional to the quantity $eZs$, in a manner to be subsequently more fully described; and, outer gimbal ring 65 which may be mounted to rotate with a shaft 68 pivoted for rotation in frame member 62, which shaft 68 has thereon a pick-off transformer 64 for obtaining a voltage representative of the quantity E. The operation of the pick-off transformers 63 and 64 is conventional and need not be described in detail.

In the operation of the vertical gyroscope, the rotor 67 may be driven by any suitable means, not shown, for example, a synchronous motor energized from a power supply of stable amplitude and which has its frequency stabilized, as by a 400 cycle tuning fork.

The rotation of the rotor 67 maintains the shaft 71 in a true vertical position as the director trains and elevates, while outer gimbal ring 65 has the axis of rotation thereof determined by the position of the inner rectangular frame member 62. As a result, transformer 64 supplies a voltage proportional to the quantity E and, since frame 62 is rotated by the quantity $Zs$, transformer 63 provides a voltage proportional to the quantity $eZs$, these voltages being utilized for purposes to be hereinafter apparent. If desired, a sec E attenuator, not shown, may be interposed between the transformer 63 and $Zs$ servo motor 95.

A second gyroscope, the aforementioned line-of-sight gyroscope, comprises a gyro rotor 75 which is rotated at constant speed by any convenient means, not shown. The rotation of the rotor 75 may take place about a shaft 79 supported in inner gimbal ring 77. The inner gimbal ring may be fixed to a shaft 80 for rotation therewith within the outer gimbal ring 76. Fixed to shaft 80 is a torque motor coil generally designated by the reference numeral 82, for purposes to be hereinafter apparent. Fixed to shaft 78, which may be fixed to ring 76, is a second torque motor coil generally designated by the reference numeral 81, these torque motor coils being portions of torque motors which, when energized by currents from leads 25 and 26, precess the line-of-sight gyroscope in traverse and elevation.

The coils 81 and 82 have associated therewith respectively cores of permanently magnetic material, not shown. The cores may be mounted upon a housing, not shown, for the line-of-sight gyroscope, and may be connected to frame 62. Whereas the line-of-sight gyroscope, for convenience of illustration, is shown as "floating," that is unsupported, it is understood that suitable supporting means is provided for mounting this gyroscope within frame 62 in a manner to allow freedom for precessive movements thereof.

Attached to the rectagular frame member 62 is a cross support 69 on which are mounted the primary and secondaries of a double E transformer 73 of conventional design. A reluctance dome 90 is attached to shaft 74 which is attached to gimbal 77 and moves with movements of the axis of rotation of rotor 75, and provides for the generation of two voltages in the secondaries of the double E transformer proportional to the displacement of the dome from its center position in two mutually perpendicular directions. These voltages are representative of the quantities $eE$ and $eBs$, and are applied by way of leads 99 and 100 to a resolver 93, hereinafter to be more fully described.

The aforementioned trunnions 51 and 52 have extended arm portions 49 and 50 respectively. A shaft 31 is supported in bearings in arms 49 and 50 and has fixed thereto for rotation therewith a gear 32, the teeth of which gear mesh with the teeth of a gear 35 fixed to shaft 36, while the shaft 36 is connected to servo motor or servo system 97 and positions shaft 31 by the quantity $E'b$, in a manner to be hereinafter described in detail. Shaft 31 may have fixed thereto to rotate therewith a housing 13 for a scanning mechanism, which may be of conventional design, and which is operatively connected by means of a length of wave guide 12 or other means with an antenna, not shown, which functions in conjunction with reflector 11. The scanning mechanism, reflector, and antenna system associated therewith provide means for causing a recurrent series of overlapping conical patterns of radiation of a type to permit a range error and angle error signals to be produced by radar apparatus, shown in block form at 18 and operatively connected by wave guide 14 to the housing 13. The radar apparatus may be of conventional design.

Gear 32 has a pin 33 fixed thereon, and frame 62 has a raised arm portion 43 having pin 42 fixed thereon. Pins 33 and 42 are operatively connected by link 34 for positioning frame member 62 by the quantity $E'b$.

The aforementioned scanning mechanism has associated therewith a reference generator, not shown, which may be of conventional design, for producing two reference voltages of the same frequency as the antenna cone scanning frequency and 90° apart in phase. These reference voltages are applied by way of leads 15 and 16 to a resolver 17 which also may be of conventional design. Resolver 17 has the moving elements thereof positioned by the quantity $Zs$ by suitable mechanical coupling to a $Zs$ servo motor 95 operatively connected to the aforementioned $eZs$ pick-off transformer 63, and converts the reference voltages from deck to true or stabilized coordinates.

After resolution at 17, the reference voltages from the reference generator are applied by way of leads 28 and 29 to a pair of phase sensitive detectors 21 and 22 respectively, both of which also have applied thereto by way of lead 27 an angle error signal from the aforementioned radar 18. The phase sensitive detectors may be of conventional design and provide output voltages representative of the deviation of the target from the center of the pattern or main axis of radiation in two mutually perpendicular directions, in a manner well known to those skilled in the art.

The outputs of the phase detectors 21 and 22 are applied to level changers 23 and 24 respectively and then to amplifiers 39 and 40 respectively, whence two currents proportional to $dBs$ and $dE$ respectively are applied by way of leads 25 and 26 to the aforementioned torque motor coils 82 and 81 respectively, for precessing the aforementioned line-of-sight gyroscope in traverse and elevation.

Preferably the gyroscope precessing circuits contain anti-tumbling circuits (not shown) constructed and arranged to prevent too rapid pressing in response to large error signals. The aforementioned $eE$ and $eBs$ voltages from "double E" or "crossed E" transformer 73 are applied by way of connections 99 and 100 to the resolver 93 which has the moving element thereof positioned by the quantity $Zs$ by the suitable coupling shown to the $Zs$ servo motor 95. From the resolver 93, which converts from true to deck coordinates, two voltages are obtained, one representative of the quantity $eE'b$, the other representative of the quantity $eB'r$. The $eE'b$ voltage is applied to an amplifier and amplidyne 96 and thence to a drive motor 97 which is operatively connected to position aforementioned shaft 31 by the quantity $E'b$. The quantity $eB'r$ is applied by way of amplifier 58 and amplidyne 57 to drive motor 56, which is operatively connected to aforementioned shaft 55 for positioning the director base 53 in train. Since the director is driven until the line of sight is on the target and the error signal nulled for a given value at any instant, the position of shaft 55 is actually representative of the quantity $B'r'$. Accordingly, the generator 94 driven from shaft 55 generates an electrical signal corresponding to the quantity $B'r'$. If desired, a secant $E'b$ attenuator, not shown may be interposed between the resolver 93 and the amplifier 58.

Operatively connected to the aforementioned E pick-off transformer 64 is an E servo motor 89 for providing a shaft rotation representative of the quantity E. A shaft 98 operatively connected to shaft 37 provides a shaft rotation corresponding to quantity $Zs$.

Operatively connected to shaft 36 is generator 91 for producing an $E'b$ signal, and responsive to this signal is a servo motor 92 for producing in shaft 85 a rotation corresponding to the quantity $E'b$. These E, $Zs$, and $E'b$ outputs are provided for purposes to be presently described.

The range error signal from radar 18 is applied to range and range rate networks 101, FIG. 1C, for purposes to be hereinafter apparent.

It will be understood that suitable means is provided for maintaining a number of electrical connections between the rotating director and apparatus located below deck. A slip ring assembly having high leakage resistance between circuits, low induction between circuits, and uniformly low contact resistance is especially desirable for use with the instant invention.

Particular reference is made now to FIGS. 1A, 1B, and 1C, which taken together comprise a schematic diagram of the entire system. It is understood, of course, that the leads of any one figure are connected to the corresponding leads of adjacent figures. The manner in which signals or shaft rotations corresponding to the quantities $E'b$, $Zs$, E, $dE$, $dBs$, and $B'r'$ are provided has been previously explained in conjunction with the description of FIG. 2. Whereas any convenient circuit or arrangement may be utilized for obtaining signals or shaft rotations representative of the quantities $\overline{dR}tw$ and R, a range and range rate network suitable for the purpose is shown in FIG. 1C, and comprises a range servo motor 121, which is adapted to drive as long as a range error signal is applied thereto and at a speed depending upon the magnitude of the signal and in a direction depending upon the polarity of the range error signal. Operatively connected to the servo motor 121 is a tachometer 122 adapted to be driven thereby and to generate a range rate voltage $dR$. Preferably a feedback circuit (not shown) connected between the output of the tachometer and the input of the servo motor permits a stabilizing voltage to be fed back from the tachometer 122 to the servo motor 121. The output of the tachometer is applied to a filter or smoothing network 123 of conventional design and the output of the filter is applied to a complex adding network shown at 125, where the wind correction $dRw$, obtained in a manner hereinafter to be described, is added to provide a $\overline{dR}tw$ voltage. A $\overline{dR}tw$ servo motor 124 positions the arm of a potentiometer 126, which supplies a voltage proportional to the quantity $c\overline{dR}tw$ to the network 125. Network 125 is constructed and arranged that the output thereof represents the error in $\overline{dR}tw$ and the output is then applied to, and drives, the servo motor 124. The shaft rotation of the servo motor 124 accordingly is representative of the quantity $\overline{dR}tw$, for reasons well known to those skilled in the art.

The apparatus generally designated by the reference numeral 105, FIG. 1B, is a wind resolution network for taking own ship's course $Co$, the true direction of true wind $Bw$, true wind speed $Sw$, and own ship's speed $So$, together with the quantities R, E, $B'r'$ and $B'r'p$, and revolving the wind factors into three wind corrections $dRw$, $RdEw$, and $RdBsw$, corresponding to the coordinates of the target information supplied by the director. The wind resolution network shown herein is particularly well adapted for use with the present invention.

In the network 105, the quantity $Bw$ is supplied, as by a handwheel, to a synchro generator 223 where it is converted into a $Bw$ signal, in any conventional manner. The output of generator 223 is applied to a differential synchro motor 226 to which is also applied the voltage $B'r'$. The motor 226 is so constructed that the output thereof is a shaft rotation $B'r'-Bw$, which is applied to a synchro control transformer 229, to which is also applied a $Co$ voltage obtained from elsewhere on the ship or vessel. The output of 229 drives a servo motor 232, to which is also coupled one shaft of 229; accordingly, 232 has applied thereto a voltage corresponding to the error in $Bws$.

The quantity $Sw$ is a hand input to a multiplying resistance network 224 to which is also applied the quantity R. The network 224 is so constructed, as will be readily understood by those skilled in the art, that the output thereof is a voltage proportional to the quantity $Rsw$, which is applied to a complex wound potentiometer resolver 227, the arm of the latter being positioned from servo motor 232 by the quantity $Bws$. Resolver 227 is so constructed and arranged that the output thereof comprises two voltages, one representative of the quantity $RXw$, where $RXw = RSw \sin Bws$, the other voltage being representative of the quantity $RYw$, where $$RYw = RSw \cos Bws$$

The $So$ input is applied by handwheel to a potentiometer multiplying network 225 which may be similar to network 224 and to which is also applied the quantity R. The output of 225 is applied to a complex potentiometer resolver 228 which has the arm thereof positioned by the quantity $B'r'p$ obtained in a manner hereinafter to be described. The resolver 228 is so constructed that the output thereof comprises two voltages $RXo$ and $RYo$, $RXo$ being substantially equal to $RSo \sin B'r'p$, and $RYo$ being substantially equal to $RSo \cos B'r'p$.

The $RXw$ and $RXo$ voltages are applied to an adding network 230, suitably constructed whereby the output thereof is the $RdBsw$ correction voltage, which is substantially equal to $k2R(Xw-Xo)$. The $RYw$ and $RYo$ voltages are applied to an adding network 231, so constructed that the output thereof is a voltage representative of the quantity $RYwr$, where $RYwr$ is substantially equal to $R(Yw-Yo)$. This RYwr voltage is applied to an additional complex potentiometer resolver 233, which has the finger thereof positioned by the quantity E by suitable coupling to an aforementioned E servo motor. Resolver 233 is so constructed that the output thereof comprises the $RdEw$ correction voltage and the $dRw$ correction voltage, where $RdEw$ is substantially equal to $k2RYwr \sin E$, and $dRw$ is substantially equal to $k3RYwr \cos E$. It will be readily understood by those skilled in the art that the proportionality factors $k2$ and $k3$ may be introduced by suitable proportioning of the resistance values of the various elements of the circuits, and/or by manipulation of the potentiometer arm centering if desired. Factor $k2$ may have a value of $23 \times 10^{-6}$ yds./sec./knot, and the factor $k3$ may have a value of $30 \times 10^{-6}$ yds./sec./knot.

A ballistic computer, generally designated by the reference numeral 104, is provided for solving certain equations of the ballistic problem, is adapted as shown to have the quantities E, $\overline{U}$, R, F and $\overline{dR}tw$ supplied thereto, and to compute the output quantities: $dHfp \cos E$, U, G–F, $f4(G)$, and $Uo$. The ballistics computer shown herein forms no part of the present invention but is especially suitable for the purpose of the instant invention.

In the ballistics computer 104, the quantity $Uo$ is computed from the following formula:

$$Uo = \overline{U} + f2(R, E) + k1Ro$$

The quantities E and R are applied to a function generator shown schematically at 163, and which is constructed and arranged to generate a mechanical movement proportional to the quantity $f2(R, E)$. The output of 163 is applied to a dividing lever 164 to which the quantity $\overline{U}$ is also applied as a handwheel input. Divider 164 is so constructed that the output thereof is the quantity $Uo$. From 164 the $Uo$ output is taken to the aforementioned fuze computer 103. $k1$ may have a value of .0402 and may be introduced by suitable proportioning of the lever dimensions, in a manner well known to those skilled in the art.

The quantity U is computed from the formula $$U = U1 + Ut + dHfp \sin E$$

where $$U1 = Uo - k1R$$
$$Ut = [f1(R - k5\overline{dR}tw) - k6\overline{dR}tw]\,\overline{dR}tw,$$
$$dHfp = k24.k25G + k4\overline{dR}tw,$$

and $$G = \frac{R}{U1 - \overline{dR}tw(k1G+1)}$$

The manner of computation of U is as follows: the inputs R and $\overline{dR}tw$ are applied to an adding lever 161, which is so constructed and arranged that the output thereof is a movement proportional to the quantity $R - k5\overline{dR}tw$, it being understood that the constant $k5$, which may have a value of 1.2, may be introduced by choice of suitable dimensions of the adding lever. The $R - k5\overline{dR}tw$ output is applied to function generator 162, which is so constructed and arranged that the output thereof is a movement proportional to the quantity $f1(R - k5\overline{dR}tw)$. This latter output is applied to a subtracting lever 166, to which $\overline{dR}tw$ is also applied; lever 166 is so constructed that the output thereof is the quantity $f1(R - k5\overline{dR}tw) - k6\overline{dR}tw + k22$, it being understood as before that the constant $k6$, which may have a value of 0.00078, and the constant $k22$, which may have a value 1.1032, may both be introduced by suitable choice of dimensions.

The output of 166 is applied to a multiplier designated by the reference numeral 167, to which the quantity $\overline{dR}tw$ is also applied. Multiplier 167 is so constructed that the output thereof is the quantity $$[f1(R - k5\overline{dR}tw) - k6\overline{dR}tw + k22]\overline{dR}tw$$

which is equal to $Ut + k22\overline{dR}tw$. The quantity $Ut$ is accordingly secured by applying the output of 167 to a subtracting lever 168, to which the input $\overline{dR}tw$ is also applied. Subtracting lever 168 is so constructed that the output thereof is the quantity $Ut$.

The quantity U1 which appears in the U equation is computed by applying the $Uo$ output of 164 to a multiplier 165 which has the input R applied thereto. Multiplier 165 is so constructed that the output thereof is the quantity U1, where $U1 = Uo - k1R$.

The quantity G, which appears in the U equation, is computed as follows: the input $\overline{dR}tw$ is applied to a multiplier 174, to which the quantity G is also supplied; multiplier 174 is so constructed and arranged that the output thereof is the quantity $\overline{dR}tw(k1G+1)$, where constant $k1$ has the value previously stated. This last named output is applied to a subtracting lever 175 to which the aforementioned quantity U1 is also applied. Lever 175 is so constructed that the output thereof is the quantity $U1 - \overline{dR}tw(k1G+1)$, which is the denominator of the quantity G. This G denominator is applied to a divider 176 to which the quantity R is also applied, and the divider 176 is so constructed and arranged that the output thereof is the quantity G.

The quantity $dHfp$ which appears in the U equation is computed as follows: The quantity G is applied to an adding lever 172, to which the quantity $\overline{dR}tw$ is also applied, and the adding lever 172 is so constructed and arranged that the output thereof is the quantity $dHfp$, where $dHfp = k24.k25G + k4\overline{dR}tw$. The constant $k24$ may have a value of 6.5, the constant $k25$ a value of 3.958, and the constant $k4$ a value of .007.

A sine and cosine function generator 171 has applied thereto the input E, and generates as outputs movements proportional to the quantities $\sin E$ and $\cos E$. The quantity $\sin E$ is applied to a multiplier 173 to which is also applied the quantity $dHfp$, the multiplier 173 being so constructed that the output thereof is the quantity $dHfp \sin E$. This output is applied to an adding lever 170, to which the quantity U1 is also applied, the output of 170 being, by suitable construction of the lever, the quantity $U1 + dHfp \sin E$. This $U1 + dHfp \sin E$ is applied to an adding lever 169 to which is also applied the quantity $Ut$, and the output of 169 is the quantity U, where $U = Ut + U1 + dHfp \sin E$, the lever 169 being suitably constructed for this purpose.

The aforementioned $dHfp \cos E$ output of ballistic computer apparatus 104 is computed as follows: The $\cos E$ output of function generator 171 is applied to a multiplier 177, to which the quantity $dHfp$ is also applied, multiplier 177 being constructed and arranged so that the output thereof is the quantity $dHfp \cos E$.

The aforementioned output quantity of $f4(G)$ is computed by applying the quantity G to the function generator 181, generator 181 being suitably constructed for this purpose.

The aforementioned output quantity $G - F$ is obtained by applying the quantities G and F to a subtracting lever 186, which is constructed and arranged so that the output thereof is the quantity $G - F$.

It will be understood by those skilled in the art that elements having suitable shapes and dimensions are provided in the ballistics computer for accurately computing the quantities and equations obtained therein.

The apparatus designated generally by the reference numeral 106 comprises elevation, traverse, and cross traverse networks. The aforementioned $dE$ and $dBs$ currents, after flowing through the coils of their respective torque motors, are applied to a pair of potentiometers 131 and 132 respectively, which have the arms thereof positioned by the quantity R by suitable mechanical coupling to the aforementioned range servo motor 121. The outputs of these potentiometers correspond to the quantities $RdE$ and $RdBs$ respectively. Preferably a potentiometer arrangement permitting accurate multiplication and division to be performed by the use of linear elements is employed.

The $RdE$ and $RdBs$ signals are applied to smoothing nets 133 and 135 respectively, each of which has a time constant of $Tq$ seconds, to secure smoothed $\overline{RdE}$ and $\overline{RdBs}$ signals. These latter signals are applied to resistance adding networks 136 and 137 respectively. $Tq$ may be of the order of two seconds.

The aforementioned $dHfp \cos E$ output of the ballistics computer 104 is applied to a voltage dividing network 134 which is so constructed that two correction voltages, $RdEfp$, and $RdBsf$, are generated, $RdBsf$ being substantially equal to $k8 dHfp \cos E$, where $k8$ is approximately $\frac{1}{30}$, it having been found by empirical investigation that the drift of a 5″/38 shell, for which caliber gun the instant fire control system is especially adapted, is equal to approximately $\frac{1}{30}$ of the gravity drop. It is understood, of course, that when used for other types of projectiles, the constant $k8$ is changed to an appropriate value, the value of the resistances in the resistance network 134 being adjusted for proper computation of the term $RdBsf$.

In the network 136, the quantities $RdEw$, $\overline{RdE}$, and $RdEfp$ are added to provide a signal proportional to the quantity $\overline{RdE}tfpw$, previously defined; likewise in the network 137, the quantities $\overline{RdBs}$, $RdBsw$, and $RdBsf$ are added to provide a signal corresponding to the quantity $\overline{RdBs}tfw$, previously defined, the networks 136 and 137 being suitably constructed for these purposes.

A second portion of the networks 106 is provided to compute the aforedefined quantity $Zsqu$, which is obtained in the adding network 144 by combining three signals proportional, respectively, to the quantities $Zu$, $Zq$ and $Zs$. The quantity $Zu$ is obtained in a resistance network 141 by applying to a potentiometer the $dBs$ current, and positioning the arm by the quantity R, where $$Zu = \frac{R - 1000 dBs}{10,000}$$

it being understood by those skilled in the art that suitable choice of component values permits $Zu$ to be computed according to the formula shown hereinbefore.

The quantity $Zq$ is obtained in a resistance network 142 by applying to a potentiometer the $dBs$ current, and positioning the arm of the potentiometer by E, suitable arrangement and choice of component values being made to permit the computation of $Zq$ according to the formula $Zq = Tq \cdot dBs \tan E$.

An electrical signal corresponding to the quantity $Zs$ is generated in potentiometer 143 which has the arm thereof positioned by suitable mechanical coupling to the aforementioned $Zs$ servo motor 95. The $Zu$, $Zq$ and $Zs$ signals are all combined in the adding network 144. Also applied to network 144 is a generated $cZsqu$ signal obtained by positioning the arm of potentiometer 146 from the $Zsqu$ servo motor 145, which has applied thereto from the network 144 the error signal $eZsqu$. Accordingly, the shaft of servo motor 145 is maintained continually in an angular position corresponding to the value of $Zsqu$, network 144 being suitably constructed for this purpose. The necessity for computing a signal proportional to the quantity $Zsqu$ is more fully disclosed hereinafter.

The aforementioned parallax computer generally designated by the reference numeral 102, comprises apparatus for solving the equation:

$$\frac{\sin B'r'p}{R} - \frac{Ph \cos E'b}{k14} = ePh \cos E'b$$

The error signal, as will be subsequently explained more fully, instead of being divided by $\cos E'b$ to obtain an $ePh$ signal, is multiplied by the secant $E'b$.

A differential generator 111 has applied thereto a portion of the output of a $Ph$ servo motor 113, as determined by the ratio of the change gears 112. The differential generator 111 is so constructed and arranged that the electrical output thereof is the quantity $B'r'p$, which is applied to a $B'r'p$ servo motor 115 to generate a shaft rotation corresponding to this quantity. The $B'r'p$ motor positions the shaft of an electrical sin generator 118, and the sin $B'r'p$ output of 118 is applied to a dividing potentiometer 117 which has the arm thereof positioned by the quantity R. The member 117 is so constructed that the output thereof is the quantity $$\frac{\sin B'r'p}{R}$$

which is applied to a resistance device 114, which may be a secant attenuator, and which has the arm thereof positioned by the quantity $E'b$, by suitable mechanical coupling to an $E'b$ servo motor 92 previously described.

The $E'b$ shaft rotation is also applied to a cosine generator 116 whose electrical output is the quantity $\cos E'b$. This $\cos E'b$ signal is applied to a multiplying potentiometer 119 which has the arm thereof positioned by the quantity $Ph$, from the aforementioned $Ph$ servo motor 113. Member 119 is so constructed that the output thereof is a voltage representing the quantity $$\frac{Ph \cos E'b}{k14}$$

the constant $k14$ being introduced to take account of the motion of the target. Suitable choice of dimensions of the device 119 permits this constant to be introduced into the circuit, in a manner well known to those skilled in the art. The constant $k14$ may have a value of $\frac{2}{3}$.

The voltage $$\frac{Ph \cos E'b}{k14}$$

is applied to member 114 together with the voltage $$\frac{\sin B'r'p}{R}$$

The output of 114, after multiplication by the quantity sec $E'b$, is the signal $ePh$, which is applied to and controls the aforementioned servo motor 113, member 114 being suitably constructed for this purpose.

A generator 120 has the shaft thereof positioned by the quantity $Ph$, and the output of 120 is the $Ph$ signal to the gun and fuze servos, which may be conventional, and which are shown in block form and generally designated by the reference numeral 108.

The aforementioned gun order converter, generally designated by the reference numeral 107, comprises apparatus for converting lead angle information in true coordinates into gun orders in deck coordinates. This is accomplished by adding the components of the computed lead angle to the coordinates which determine the line of sight, the result being the correct gun pointing.

Except for corrections for gravity drop of the projectile, drift, parallax, wind, etc., the lead angle may be considered to be defined as the angle intercepted at the gun director by a vector representing the tangential displacement of the target during the time of flight of the projectile. It therefore follows that:

sine lead angle $$= \frac{\text{tangential displacement of target during time of flight}}{\text{target slant range}}$$

$$= \frac{\text{tangential velocity of target} \times \text{time of flight}}{\text{average velocity of bullet during flight} \times \text{time of flight}}$$

Therefore, $$\text{sine lead angle} = \frac{1}{U2} \times \text{tangential velocity of target}$$

It is thus clear that $RdBs$ and $RdE$ which represent the true components of the tangential velocity will define the lead angle, provided the quantity $U2$ is known.

In the instant apparatus, as previously stated, the $RdE$ and R*dBs* lead angle voltages have wind, drift, parallax, and gravity drop corrections made thereto in the network 106, becoming after correction R*dEtfpw* and R*dBstfw* respectively.

The angle converter generally designated by the reference numeral 210 serves as a mechanical model which sets up the vector relationship defining the lead angle. Finger or arm 219 is displaced by gearing 214 in such a manner that the voltages from tapered potentiometer cards 212 and 213 represent the quantities $$\frac{c\overline{Rd}Etfpw}{U}$$

and $$\frac{c\overline{Rd}Bstfw}{U}$$

respectively.

The servo systems associated with the angle converter 210 are used to effect the displacement of finger 219 by the desired amount, in the following manner.

An amplifier 201 has applied thereto the aforementioned $\overline{Rd}Etfpw$ signal from the elevation and traverse networks 106. Applied to this amplifier also is the generated voltage $c\overline{Rd}Etfpw$, obtained from a multiplying potentiometer 203 which has the arm thereof positioned by the quantity U by a suitable operative connection to the aforementioned ballistics computer 104. Applied to the potentiometer 203 is the aforementioned voltage $$\frac{c\overline{Rd}Etfpw}{U}$$

obtained from the angle converter 210.

An amplifier 202 has applied thereto the aforementioned $\overline{Rd}Bstfw$ signal from the elevation and traverse networks 106. Applied to this amplifier also is a generated voltage $c\overline{Rd}Bstfw$, obtained from a multiplying potentiometer 205 which has the arm thereof positioned by the quantity U by a suitable operative connection to the aforementioned ballistics computer 104. Applied to the potentiometer 205 is the aforementioned voltage $$\frac{c\overline{Rd}Bstfw}{U}$$

obtained from the angle converter 210.

The outputs of these differential amplifiers 201 and 202, which may contain subtracting resistance networks if desired, are two error signals *eV* and *eD* respectively, which represent substantially the instantaneous errors between the computed lead angles and the generated or actual lead angles. The *eV* and *eD* voltages in true coordinates are applied to a resolver 204 where they are resolved by the quantity Z*squ* and converted into error signals in deck coordinates *eV'd* and *eD'd* respectively. These latter signals are applied to servo motors 206 and 207 respectively. Preferably, the D'*d* signal is applied by way of a secant E'*g* attenuator, not shown, interposed between resolver 204 and the servo motor 207. Preferably, the amplitudes of both the V'*d* and D'*d* signals are controlled by applying them through a pair of dividing potentiometers, not shown, both of which have their arms positioned by the quantity U.

The particular gearing 214 employed for positioning the arm 219 constitutes no part of the present invention, but the nature of the gearing requires the particular inputs provided, that is, the E'*b* input, 2D'*d*+E'*b*+2V'*d* input, and the 2D'*d*+E'*b* input.

The gun elevation order signal E'*g* in deck coordinates is provided by the generator 218 which has the shaft thereof positioned from the differential 215, in which the director elevation E'*b* in deck coordinates is added to the computed lead angle V'*d* in deck coordinates. Similarly, the gun train order signal B'*grp* in deck coordinates is provided by the generator 208, which has the shaft thereof positioned from the differential 211, in which the director train B'*r'p* in deck coordinates is added to the computed lead angle D'*d* in deck coordinates.

The potentiometer cards 212 and 213, suitably tapered to provide the desired manner of operation, are adapted to be rotated by gearing 209 through an angle corresponding to the quantity Z*squ*. As previously stated, the quantity Z*squ* is obtained in the network 206 and is the sum of the quantities Z*s*, Z*q* and Z*u*. The quantity Z*s* as aforedefined measures the rotation of the target about the line of sight as a result of the rotation of the ship; accordingly, the Z*s* rotation at 209 is required to compensate in the angle converter for departure of the deck from a true horizontal plane.

A further rotation at 209 by the amount Z*q* compensates for the time interval by which the rate signals are delayed due to the smoothing time T*q*.

A further rotation at 209 by the amount Z*u* compensates for errors resulting from tapering of the potentiometers.

Potentiometers 212 and 213 are tapered to the function of a term in the quantity U3 which it is difficult to compute, with the result that while the length and position of arm 219 sets up a vector quantity corresponding to the quantity U3, the voltages from potentiometers 212 and 213 represent respectively the quantity $$\frac{c\overline{Rd}Etfpw}{U}$$

and the quantity $$\frac{c\overline{Rd}Bstfw}{U}$$

From two additional suitably tapered potentiometers 236 and 235, mounted adjacent cards 213 and 212 respectively, two voltages, respectively equal to $(\tan D)^2$ and $(\tan V - k26)^2$ are obtained and applied to a fuze computer, generally designated by the reference numeral 103 provided for purposes to be hereinafter apparent.

The constant *k*26 may have a value of 0.04, and may be introduced by displacement of the arm of the potentiometer from its zero position when V has the value of zero.

FIG. 3D illustrates the gun order vector problem of the angle converter. Accordingly, a gun order converter is provided from which a gun elevation order signal E'*g* is applied to the gun and fuze servos 108, FIG. 1A, and from which a gun train order signal B'*grp* is applied to the gun and fuze servos 108 associated with gun 7.

Th aforementioned fuze computer, shown in block form and generally designated by the reference numeral 103, is adapted to have applied thereto inputs corresponding substantially to the quantities G−F, *f*4G, U, $(\tan D)^2$, $(\tan V - k26)^2$, *dR* and T*g*, and to compute a fuze time order corresponding to the quantity F. The fuze computer constitutes no part of the instant invention. A computer especially adapted for use with the instant invention is described and claimed in the copending application of Leroy A. Nettleton and Carlton W. Miller for Fuze Computer, Serial No. 661,024, filed April 10, 1946, now abandoned.

The fuze order output of 103 is applied to the gun and fuze servos shown in block form at 108.

Whereas in some instances the invention has been shown and described with reference to the use of servo motors, it is understood that more elaborate servo sysems may be employed if desired.

It will be understood by those skilled in the art that sources of electrical energy of the proper polarities are provided for the various electrical circuits, and that the circuits are constructed and arranged to provide signals of the correct polarities to provide for the operation of the apparatus in the desired manner.

Whereas it has been stated that certain components of the circuits may be adjusted to desired values, it is understood that values of all impedances in the circuits may be adjusted to suitable values to provide for operation of the apparatus in the manner desired.

The operation of the aforedescribed method and apparatus may be summarized as follows: The director by utilizing radar provides target information in stabilized coordinates which is used to train the director and elevate the antenna system of the radar to maintain the line of sight of the director substantially on the line between the target and director. The gyroscopic means of the director provides information as to the true elevation of the target and the cross roll of the ship. Also attached to the director are devices for transmitting information to the computing network regarding the elevation of the antenna and the train of the director. A wind resolution network takes information as to the ship's course and speed and the wind speed and direction and resolves this into three wind components lying along the three coordinates of the target information system. This wind information is utilized in conjunction with information from the director and radar to compute gun orders for positioning a gun in train and elevation and also to compute a fuze order so that a shell fired by the gun will arrive at a correct future position of the target.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In gun fire control apparatus of the character disclosed for use aboard a vessel, a director adapted to be rotatably mounted upon the deck of the vessel and including a pair of gyroscopes movably mounted in predetermined positions therein, a first one of said gyroscopes being adapted to maintain a true vertical position as the vessel and director move, means operatively connected to said first gyroscope for obtaining a voltage proportional to the angle of target elevation E, means operatively connected to said first gyroscope for obtaining a voltage proportional to the instantaneous error in angle of cross traverse, $eZs$, means responsive to the said $eZs$ voltage to produce a quantity representative of the cross-traverse angle, $Zs$ radar means including movable antenna means mounted upon said director, a pair of torque motors mounted in predetermined positions with respect to the second one of said gyroscopes and adapted when energized to precess said second gyroscope in traverse and elevation, means operatively connected to said radar means and to said torque motors for supplying currents to said torque motors proportional to the angular elevation rate, $dE$, and angular traverse rate, $dBs$ thereby to precess said second gyroscope in a direction which tends to maintain the spin axis thereof along a straight line between target and director, means operatively connected to said second gyroscope for obtaining two voltages respectively representative of the instantaneous error in angle of elevation $eE$ and the instantaneous error in true target bearing, $eBs$, means responsive to the said quantity representative of cross-traverse angle for resolving said $eE$ and $eBs$ voltages to provide voltages proportional to instantaneous error in the target elevation angle from the deck, $eE'b$, and the instantaneous error in the director train in the slant plane parallel to the deck $eB'r$ respectively, and means for amplifying said $eE'b$ and $eB'r$ voltages and utilizing them to respectively position said antenna means in elevation and said director in train.

2. Gun fire control apparatus of the character disclosed for use aboard a vessel comprising, in combination, director means rotatably mounted upon the deck of the vessel, gyroscopic means mounted in said director means, said gyroscopic means including a pair of gyroscopes movably mounted in predetermined positions, radar means including an antenna system having a conical pattern of radiation, said antenna system being movably mounted upon said director means and adapted to rotate about an axis substantially perpendicular to the axis of rotation of said director means to define a line of sight to a target, said radar means being adapted to supply currents proportional to the angular target elevation rate, $dE$, and angular traverse rate, $dBs$, means operatively connected to a first one of said gyroscopes for utilizing said $dE$ and $dBs$ currents to precess said first gyroscope, means operatively connected to said first gyroscope for obtaining therefrom two voltages proportional respectively to the instantaneous errors in elevation, $eE$ and in traverse, $eBs$, means operatively connected to the second gyroscope for obtaining therefrom voltages proportional to the elevation quantity, E, means connected operatively to the said second gyroscope for generating a voltage proportional to instantaneous errors in cross-traverse angle $eZs$, and means responsive to the said generated cross-traverse error voltage, $eZs$, for producing a quantity continuously representative of the cross-traverse angle $Zs$, means for utilizing said $eZs$, $eE$, and $eBs$ voltages to continually position said director means in train and said antenna system in elevation whereby the main axis of said conical pattern tends to be maintained on the line between target and director; means for obtaining from said last named means a voltage proportional to the angle of target elevation about said deck, $E'b$; means operatively connected to said director for obtaining a voltage proportional to the director train $B'r'$; generating means operatively connected to said radar means for obtaining a voltage proportional to the target range R; a parallax computing network adapted to receive a plurality of voltages corresponding respectively to said quantities R, $E'b$, and $B'r'$ respectively, and to generate two voltages corresponding respectively to the director train corrected for horizontal parallax to a reference point $B'r'p$, and to the angular correction $Ph$, to be applied to the gun train order for a gun displaced from said point $Ph$; a wind resolution network adapted to receive a plurality of inputs corresponding respectively to own ship's course $Co$, true wind direction $Bw$, true wind speed $Sw$, own ship's speed $So$, train of the director with respect to own ship's axis $B'r'$, elevation E, target range R, and said parallax corrected director train $B'r'p$, and to generate three output voltages corresponding respectively to the quantities elevational wind component perpendicular to the line-of-sight, $RdEw$, linear traverse rate correction due to cross wind, $RdBsw$, and range rate correction due to line-of-sight wind, $dRw$; means operatively connected to said R voltage generating means and adapted to have said $dRw$ voltage applied thereto and to generate a voltage corresponding to the target range rate corrected by the effects of said line-of-sight wind on shell velocity, $\overline{dR}tw$; ballistic computer means adapted to receive inputs corresponding to the fuse setting in seconds of said shell F, target elevation E, average shell velocity $\overline{U}$, target range R, and said corrected target range rate $\overline{dR}tw$, and to generate a plurality of voltages corresponding respectively to the quantities $dHfp \cos E$, U, $G-F$, $Uo$, and $f4(G)$ where $dHfp$ is the gravity drop rate corrected for vertical parallax, E is said elevation, U is average shell velocity for lead angle computation, G is computational time of shell flight, F is said fuse setting, $Uo$ is shell velocity for fuse computation, and $f4(G)$ is an exponential function of shell flight time; elevation, traverse, and cross traverse networks adapted to receive a plurality of voltages corresponding respectively to said quantities $Zs$, $dE$, $dBs$, E, $RdEw$, $RdBsw$, R and $dHfp \cos E$, and to generate and supply a plurality of voltages corresponding respectively to the quantities $Zsqu$, $RdEtfpw$, and $RdBstfw$ where $Zsqu$ is the computational rotation of the director about said line-of-sight, $RdEtfpw$ is the linear elevation rate for computation of lead angle, and $RdBstfw$ is the linear traverse rate for the computation of lead angle, a gun order converter adapted to receive inputs corresponding to said quantities $E'b$, $Zsqu$, $RdEtfpw$, $RdBstfw$, U, and $B'r'p$, and to generate and compute a plurality of voltage outputs corresponding respectively to the quantities $(\tan D)^2$, $(\tan V-k26)^2$, $E'g$, and $B'grp$ where D is the traverse deflection angle, V is the vertical deflection angle, $k26$ is a constant of the order of .04, $E'g$ is the gun elevation order above the deck, and $B'grp$ is the gun train order corrected for horizontal parallax; and a fuze computer adapted to receive a plurality of inputs corresponding respectively to said quantities $(\tan D)^2$, $(\tan V-k26)^2$, $G-F$, $Uo$, $f4(G)$, and $\overline{dR}tw$ and to the fuse dead time in second, $Tg$, and to compute an output voltage corresponding to the quantity F, said F output being applied to said ballistic computer linkage mechanism, said F, $E'g$, $Ph$, and $B'grp$ output voltages being adapted to be applied to the gun and fuze servos of a battery of the vessel's guns.

3. In fire control apparatus of the character disclosed, in combination, movable director means including a movable antenna system, said antenna system including a radiator, a reflector, and rotating means adapted to continually move said radiator to provide a conical pattern of radiation when the antenna system is energized, radar means including a transmitter, receiver, control circuits, and range and angle error circuits, operatively connected to said antenna system for energizing the same, a reference generator operatively connected to said rotating means for generating two reference voltages of the same frequency as the rate of rotation of said radiator and 90 degrees apart in phase, first and second gyroscopic means each including a movable gyroscope and disposed in said director means in predetermined positions therein, said first gyroscopic means being adapted to generate voltages corresponding to the inclination E of the director from horizontal and rotational increments $eZs$ of the director about a line-of-sight, means for utilizing said $eZs$ voltage to resolve said reference voltages by the rotational quantity $Zs$; a pair of phase sensitive detectors, both of said phase sensitive detectors having the output signal from said angle error circuit applied thereto, said reference voltages being applied to said phase sensitive detectors respectively, means operatively connected to both said phase sensitive detectors and to said second gyroscopic means for precessing the gyroscope thereof, and means operatively coupled to said second gyroscopic means for positioning said director means in train and said antenna system in elevation in response to precessions of the gyroscope of said second gyroscopic means.

4. Gun fire control apparatus for deck mounting of the character disclosed, comprising, in combination, director means defining a line-of-sight to a target, said director means including apparatus for obtaining information as to the angular elevation $E'b$ of the target above deck, apparatus for obtaining information as the rotation of the director means about said line-of-sight, $Zs$, apparatus for obtaining information as to the target elevation rate, $dE$, apparatus for obtaining information as to the target traverse rate, $dBs$, apparatus for obtaining information as to the angular elevation E of target above horizontal, apparatus for obtaining information as to the director train $B'r'$, apparatus for obtaining information as to the target range R, and apparatus for obtaining information as to the range rate $dR$, and computing means operatively connected to said director means and adapted to utilize said information to compute elevation and traverse gun orders in the quantities $E'g$ and $B'grp$.

5. Gun fire control apparatus according to claim 4 wherein said apparatus for obtaining information as to the rotation of the director means about said line-of-sight, $Zs$ includes a frame pivotally supported on an axis parallel to said line-of-sight, means for pivoting said frame by the quantity $Zs$, gyroscopic means movably mounted in predetermined position in said frame and adapted to maintain a true vertical position as the frame moves, and transformer means operatively connected to said gyroscopic means and to said frame and adapted to supply an output voltage representative of instantaneous errors in said $Zs$, said last named means being operatively connected to said pivoting means.

6. In gun fire control apparatus of the character disclosed, in combination, director means including a movable gyroscope, radar means operatively connected to said director means for defining a line-of-sight and adapted to provide an angle error signal, and means operatively connected to said radar means and to said gyroscope for utilizing said angle error signal to position said director means in train and elevation, said last named means including apparatus for obtaining two reference voltages, means for modifying said reference voltages with the quantity $Zs$ proportional to the rotation of the director around said line-of-sight, a pair of phase sensitive detectors, said angle error signal being applied to both of said phase sensitive detectors, said reference voltages after modification being applied to said phase sensitive detectors respectively, a pair of torque motors coupled to said phase sensitive detectors and operatively connected to said gyroscope for precessing the same, and means responsive to the precession of the gyroscope for moving the director means.

7. In gun fire control apparatus of the character disclosed, for use aboard a vessel, in combination, movable director means for establishing a line of sight including a pair of gyroscopes, means for producing a voltage representative of an instantaneous rotational error in the said line of sight $eZs$, and means responsive to the said last-mentioned means for obtaining from a first one of said gyroscopes a voltage proportional to the rotation of the director means about the line-of-sight, $Zs$, means operatively connected to said last named means and to said first gyroscope for reducing said $eZs$ voltage to zero, means operatively connected to the second of said gyroscopes for obtaining drive voltages proportional to the mutually perpendicular precessions of the gyroscope, means for utilizing said rotation voltage $Zs$, to modify said drive voltages, and a pair of servo systems operatively connected to said director means and adapted to utilize said voltages after modification to position said director means respectively in train and in elevation.

8. In fire control apparatus of the character disclosed for use aboard a vessel, in combination, director means movable in train and elevation and including a pair of support members, a first frame member rotatably mounted on said support members, a second frame member rotatably mounted within said first frame member and adapted to rotate about an axis substantially perpendicular to the axis of rotation of said first frame member, a first gyroscope movably mounted in predetermined position in said second frame, transformer means operatively connected to said first gyroscope for obtaining therefrom a first voltage representative of the quantity $eZs$, which quantity is analogous to instantaneous rotations of said second frame from a predetermined reference plane, a second gyroscope movably mounted in predetermined position in said second frame, first and second torque motors operatively connected to said second gyroscope and adapted when energized to precess said second gyroscope, means for energizing said torque motors, transformer means operatively coupled to said second gyroscope for obtaining therefrom a pair of voltages respectively representative of the quantities $eE$ and $eBs$ which are analogous respectively to the instantaneous deviations in elevation and traverse of said frames from predetermined positions, means including means producing a quantity representative of the cross-traverse angle $Zs$, for resolving said pair of voltages by the quantity $Zs$, and means for utilizing said pair of voltages after resolution to position said director means in elevation and train respectively.

9. In fire control apparatus of the character disclosed for use aboard a vessel, in combination, movable director means including a movably mounted antenna system, said antenna system comprising a reflector, a nutatable antenna and a nutating mechanism therefor, radar means including means producing signals representative of range error and angle error operatively connected to said antenna system, reference generator means operatively connected to said nutating mechanism; resolver means operatively connected to said reference generator means; a pair of gyroscopes movably mounted in predetermined positions in said director means, means for obtaining from a first gyroscope of said pair a voltage representative of the quantity $eZs$ which quantity is representative of instantaneous deviations of one gimbal of said first gyroscope from a predetermined reference plane, means for utilizing said $eZs$ voltage to activate said resolver means, a pair of phase sensitive detectors operatively connected to said radar means and adapted to have the angle error signal applied thereto, a pair of torque motors operatively connected to the second of said gyroscopes, said torque motor being connected to said phase sensitive detectors respectively and adapted to be energized therefrom, said second gyroscope being adapted to be precessed upon the energization of said torque motors, means operatively coupled to said second gyroscope for obtaining therefrom two voltages respectively representative of the quantities $eE$ and $eBs$ which are analogous respectively to the instantaneous deviations in elevation and traverse of the spin axis of said second gyroscope, means including means producing a quantity representative of the rotational position of the said one gimbal for resolving said last named voltages by the quantity $Zs$, means for utilizing said $eE$ voltage after resolution to position said antenna system in elevation, and means for utilizing said $eBs$ voltage after resolution to position said director means in train.

10. In fire control apparatus of the character disclosed for use aboard a vessel, in combination, movable director means adapted to be positioned in train and having thereon movable antenna means adapted to defining a line-of-sight and to be positioned in elevation, radar means operatively connected to said antenna means, said radar means being adapted to generate a target angle error signal, means for utilizing said angle error signal to position said director in train and said antenna means in elevation, said means for utilizing including gyroscopic means movably mounted in predetermined position in said director means and means responsive to the said gyroscope means to provide voltages corresponding to incremental deviations of rotation $eZs$ of said director about said line-of-sight, and incremental deviations in elevation $eE$, and in traverse $eBs$ of said director and means including servo systems responsive to said last named voltages operatively connected to said director means and said antenna means to maintain the said director and the said antenna means oriented continuously in a direction which minimizes the aforesaid target angle error signal.

11. In fire control apparatus of the character disclosed for use aboard a vessel, in combination, movable director means, said director means including a pair of gyroscopes movably mounted in predetermined orientations within said director means, the first one of said pair of gyroscopes being adapted to maintain a true vertical position as the director moves, the second of said gyroscopes being adapted to maintain its axis of rotation substantially along a straight line between director means and target, means responsive to said first gyroscope to detect rotation of said director means about said line and to thereby generate a quantity $eZs$, means responsive to the last mentioned means to produce a quantity $Zs$, representative continuously of the magnitude of director displacement from said line, torque motor means operatively connected to the gimbals of said second gyroscope and adapted when energized to precess said second gyroscope, means for energizing said torque motor means, transformer means operatively coupled to said second gyroscope and adapted to provide signal voltages $eE$ and $eBs$ corresponding to changes in elevation and traverse, respectively, of said director, means for combining said last named voltages with director rotation about said line, $Zs$, means for utilizing said $eBs$ voltage after combining to position said director means in train, and means for utilizing said $eE$ voltage after combining to position said director means in elevation.

12. In fire control apparatus of the character disclosed for use aboard a vessel, in combination, director means, a pair of spaced supporting elements in said director means, a first frame member rotatably mounted in said supporting elements and adapted to be rotated therein, a second frame member rotatably mounted in said first frame member, the axis of rotation of said second frame member being substantially perpendicular to the axis of rotation of said first frame member, a pair of gyroscope means movably mounted in said second frame member in predetermined positions therein, a first one of said gyroscope means having operatively connected thereto transformer means adapted to provide a voltage $eZs$, corresponding to the incremental rotations of one gimbal of said first gyroscope, servo means operatively connected to said transformer means and to said second frame for rotating said second frame by the quantity $eZs$ thereby tending to maintain said $eZs$ voltage at zero, and servo means operatively connected to said first frame member and to the second gyroscopic means for driving said first frame member about its rotatable mounting in accordance with precessions of said second gyroscope.

13. A gun fire control system for use on a vessel which can roll and pitch and can rotate about a line-of-sight between a director on said vessel and a target, said system comprising in combination, a director system including a target position determining radar displaced from a reference point on said vessel, said director system having outputs containing quantities respectively analogous in magnitude to the target position and rate information including the angular elevation of the director and said line-of-sight above the deck plane of said vessel $E'b$, angular elevation of the director above the true horizontal plane $E$, angular elevation rate $dE$, the director train angle in said deck plane $B'r'$, the instantaneous angular traverse rate $eBs$, the target range $R$, and the angle of rotation of the director about said line-of-sight due to the attitude of the vessel $Zs$; and means including computing means operatively connected to and responsive to said outputs and adapted to generate gun orders $E'g$, $B'grp$ and $Ph$, where $E'g$ is elevation angle of the gun above said deck measured in a plane through the gun perpendicular to the deck, $B'grp$ is the gun train order corrected for horizontal parallax of the director to said reference point on said vessel, and $Ph$ is the horizontal parallax angularly corrected for displacement of said gun from said reference point, said computing means being also adapted to generate a quantity analogous to fuse setting in seconds.

14. A gun fire control system according to claim 13 in which said computing means includes wind resolution apparatus with a plurality of inputs and a plurality of outputs, means to feed into said inputs quantities corresponding respectively to own ships course $Co$, and own ships speed $So$, true direction of wind $Bw$, and true wind speed $Sw$, the director train $B'r'$, the director train corrected for horizontal parallax to a reference point on own ship $B'r'p$, the elevation of the line-of-sight above the horizontal plane $E$, and the range of the target; said apparatus being adapted to generate and to produce at said outputs three wind correction voltages corresponding respectively to the components of wind parallel to and at elevation and traverse directions across the line-of-sight; said computing means combining said wind correction voltages with said target position and rate quantities to produce gun elevation orders $E'g$, and gun train orders $B'grp$ compensating for the effects of wind.

15. A gun fire control system according to claim 13 in which said computing means includes range and range rate apparatus adapted to receive a plurality of inputs according to the quantities $R$ and $dRw$, where $R$ is the range of the target, and $dRw$ is the range rate of the target corrected for the effect on shell velocity of wind along the line-of-sight, and computing means having means to generate at the output of the computing means a quantity analogous in magnitude to the range rate for the computation of the average shell velocity corrected for the line-of-sight wind, $\overline{dR}tw$, and means accepting said $\overline{dR}tw$ quantity and adapted to generate a quantity analogous to fuse setting in seconds.

16. A gun fire control system according to claim 13 in which said computing means includes elevation, traverse and cross traverse network apparatus adapted to receive a plurality of inputs corresponding, respectively, to said quantities $Zs$, $dE$, $dBs$, $E$, and $R$, said network apparatus also being adapted to receive inputs corresponding to linear elevation rate correction due to elevation in wind, $RdeW$, and linear transfer rate corrections due to cross wind $RdBsw$, said apparatus being adapted to generate a plurality of outputs corresponding, respectively, to the computation rotation of said director about the line-of-sight $Zsqu$, and the computational linear elevation rate for lead angles $RdEtfpw$, and the computation linear traverse rate for lead angle correction due to traverse wind $RdBstfw$, and computing means utilizing setting $Zsqu$, $RdEtfpw$ and $RdBstfw$ outputs in computing said quantities $B'grp$ and $E'g$.

17. In a gun fire control apparatus of the character described for firing at a target from a gun on a rolling and pitching deck of an own ship, in combination, director means including radar sight and detecting apparatus for obtaining a plurality of target information output quantities proportional respectively to the range of the target $R$, the range rate $dR$, target elevation angle above the horizontal plane $E$, the radar director elevation above the deck $E'b$, the director train $B'r'$, the angle of rotation of the director around the line of sight $Zs$, and the angular elevation rate $dE$, and angular traverse rate $dBs$, in the cross traverse plane perpendicular to the line-of-sight; voltage generating means operatively connected to and responsive to said director means generating two voltages respectively proportional to the linear elevation rate $RdE$, and the linear traverse $RdBs$, in said cross traverse plane; means adapted to measure the director train in the deck plane $B'r'$, the own ship course $Co$, the true direction of wind $Bw$, the true horizontal wind speed $Sw$, and the own ship speed $So$, and means responsive to the mentioned measuring means to compute wind corrections comprising elevation components of wind $RdEw$, and traverse component of wind $RdBsw$, both perpendicular to the line-of-sight, means to apply said linear elevation and traverse wind rates to said angular elevation and traverse rates, respectively, to compensate for the effect of said components on said shell velocity, means operatively connected to said correction means, to said director means, and to said voltage generating means for obtaining three voltages, respectively, of the smoothed angular rotation of the director around the line-of-sight corrected by a constant factor dependent on range and rate of cross traverse $Zsqu$, the smooth linear elevation rate corrected for gravity drop and vertical wind $RdEtfpw$, and the smoothed linear traverse rate corrected for traversal projectile drift and cross wind $RdBstfw$, and means including a gun order converter operatively connected to said last named means and to said director means for utilizing said three last named voltages to compute gun elevation order $E'g$, and gun train order corrected for horizontal parallax $B'grp$, for positioning the gun to fire at the target.

18. In gun fire control apparatus for use aboard a vessel having a deck, a director; means for rotatably mounting the said director on the said deck; a train drive motor coupled to the said director to drive the said director rotatably in train from a reference position through the director train angle $B'r'$; means including radar means and a directional antenna system establishing a line of sight; means mounting the said antenna system on the said director for rotation about an axis substantially perpendicular to the axis of rotation of the said director; means connected operatively to the said antenna system for driving the said system through the director elevation angle $E'b$; a pair of gyroscopes; means including at least two frames for movably mounting the said gyroscopes in predetermined positions in the said director; means to mount the first of the said two frames for rotation on an axis parallel to the axis of rotation of the said antenna system; means to mount the second of the said two frames in the said first frame for rotation on an axis at least parallel to the line of sight and perpendicular to the axis of rotation of the said first frame; means connected to the said first frame and to the said antenna system driving means for elevating the first frame through the said director elevation angle $E'b$; means mounting the first of the said gyroscopes in the said second frame such that the axis of spin of the first gyroscope will be maintained fixed notwithstanding displacements of the said second frame; means connected operatively to the said first gyroscope for producing a voltage proportional to the true target elevation angle $E$; means operatively connected to the said first gyroscope to produce a voltage representative of the cross-traverse error angle $eZs$, proportional to any instantaneous displacement of the said second frame; means connected operatively to the said second frame and responsive to the said $eZs$-voltage-producing means for rotating the said second frame through the cross-traverse angle $Zs$ around the line of sight; means coupled to the last-named rotating means to generate an electrical quantity representative of the said angle $Zs$; a pair of torque motors; means to couple the said torque motors to the said second gyroscope such that the torque of each applied through the said coupling to the gyroscope produces a component of precession for each of two mutually perpendicular planes; means coupled operatively to the said director and the said radar means for generating currents proportional to the rate of change of elevation, $dE$, and to the rate of change of traverse angle $dBs$; means applying the said currents to the said torque motors such that the spin axis of the said second gyroscope is maintained at least parallel to the said line of sight; means coupled effectively to the said second gyroscope for generating two independent voltages, each proportional respectively to the instantaneous error in elevation angle $eE$, and in the traverse angle $eBs$; means for resolving each of the last named voltages by the said electrical quantity representative of $Zs$ to produce two voltages respectively proportional to the instantaneous error in the director elevation angle $eE'b$, and the instantaneous error in the director train angle measured in the slant plane parallel to the deck plane $eB'r$; means including amplifying means coupled effectively to the said train drive motor and responsive to the said director train error voltage for operating the said train drive motor to eliminate the said error angle $eB'r$; and means including amplifying means coupled effectively to the said antenna-system driving means and to the said elevating means and responsive to the said director elevation error voltage for operating the latter two means to eliminate the said instantaneous error in the director elevation angle $eE'b$.

19. In gun fire control apparatus for use aboard a vessel having a deck, a director including means establishing a line of sight; means to mount the said director for rotation in the plane defined by the said deck of the vessel; a pair of support members and means to fasten the support members fixedly in the said director; a first frame having means mounting the said frame for rotation on the said pair of support members; a second frame having means mounting the said second frame in the said first frame for rotation on an axis perpendicular to the axis of rotation of the said first frame; a first gyroscope; means supporting the said first gyroscope in the said second frame for precession around a spin axis having a pre-established normal orientation; a second gyroscope; means mounting the said second gyroscope for precession around an axis at least parallel to the said line of sight; means for producing a quantity representative of the angular error in cross traverse $eZs$, at any instant including means coupling the last-named producing means for response to precession of the said first gyroscope in one direction; means for producing a quantity representative of the angle of true target elevation E, including means coupling the last-named producing means for response to precession of the said first gyroscope in a direction perpendicular to the said one direction; means for producing a quantity representative of the cross-traverse angle $Zs$, including means coupling the last-named producing means for response to the said $eZs$-quantity producing means; means for rotating the said second frame through the said cross-traverse angle $Zs$, including means coupling the last-named rotating means for response to the said $Zs$-quantity producing means; means for producing a quantity representative of the director elevation angle, $E'b$, including means intercoupling the last-named producing means for response to the precession of the said second gyroscope and to the output of the said $eZs$-quantity producing means; means for rotating the said first frame through the said director elevation angle $E'b$, including means coupling the last-named rotating means for response to the said $E'b$-quantity producing means; means in operative relationship with the said director for producing two quantities representative respectively of displacements in elevation and traverse of the said line of sight from a pre-established orientation; and two torque motors including means coupling each of the said motors to the said second gyroscope and further means coupling each of the said motors for response to a separate one of the aforesaid elevation-and-traverse-quantity producing means such that the said motors cause precession which maintains the spin axis of the said second gyroscope at least parallel to the said line of sight.

References Cited in the file of this patent

UNITED STATES PATENTS

| | | |
|---|---|---|
| 1,551,393 | Hewlett et al. | Aug. 25, 1925 |
| 1,747,664 | Droitcour | Feb. 18, 1930 |
| 2,130,899 | Peters | Sept. 20, 1938 |
| 2,139,636 | House | Dec. 6, 1938 |
| 2,339,508 | Newell | Jan. 18, 1944 |
| 2,399,426 | Bradley | Apr. 30, 1946 |
| 2,409,448 | Rost et al. | Oct. 15, 1946 |
| 2,414,108 | Knowles et al. | Jan. 14, 1947 |
| 2,463,687 | Gittens | Mar. 8, 1949 |
| 2,616,625 | Griest et al. | Nov. 4, 1952 |
| 2,617,982 | Holschuh et al. | Nov. 11, 1952 |
| 2,658,680 | Holbrook et al. | Nov. 10, 1953 |
| 2,660,793 | Holschuh et al. | Dec. 1, 1953 |